United States Patent Office 3,453,179
Patented July 1, 1969

3,453,179
MICROBIOLOGICAL MODIFICATION OF
BENZODIAZEPINES
George Greenspan, Merion, Hans W. Ruelius, Wayne,
and Harvey E. Alburn, West Chester, Pa., assignors to
American Home Products Corporation, Inc., New York,
N.Y., a corporation of Delaware
No Drawing. Filed Feb. 7, 1967, Ser. No. 614,409
Int. Cl. C12b *1/00;* C07d *51/38*
U.S. Cl. 195—51                                5 Claims

ABSTRACT OF THE DISCLOSURE

Process for the microbiological modification of benzodiazepine derivatives, including diazepam, by fermentation of such derivatives in the presence of certain strains of the fungus *Pellicularia filamentosa*. The products obtained are benzodiazepine derivatives and quinazolinone derivatives which are useful as intermediates for preparing other benzodiazepine and quinazolinone derivatives and/or also for their pharmaceutical activity per se as tranquilizing agents.

BACKGROUND OF THE INVENTION

The invention relates generally to the art of chemistry and, more particularly, to processes for preparing derivatives of benzodiazepines which have utility as tranquilizers or as intermediates for the preparation of such benzodiazepines. Benzodiazepine derivatives, including diazepam, are known for said tranquilizer activity and/or utility as intermediates for the preparation of such benzodiazepine derivatives by various known chemical methods.

SUMMARY OF THE INVENTION

In its broadest process aspect, the present invention resides in a method of causing the microbiological transformation of a compound selected from the group consisting of those having the following general formula:

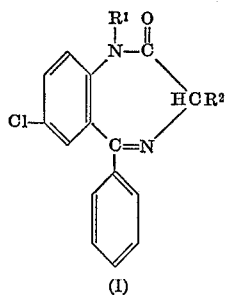

(I)

wherein $R^1$ is of the group consisting of hydrogen and methyl and $R^2$ is of the group consisting of hydrogen and hydroxy, which method comprises:

fermenting a compound of Formula I above in the presence of a strain of the fungus *Pellicularia filamentosa* selected from the group consisting of f. sp. *microsclerotia* CBS, f. sp. *microsclerotia* IFO 6298, and f. sp. *sasakii* IFO 6675, to obtain a compound of the group having the following general formula:

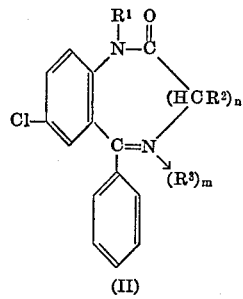

(II)

wherein $R^1$ and $R^2$ have the same meaning as in Formula I; $R^3$ is oxygen; and $n$ and $m$ are both integers from 0 to 1 only when limited by the following provisos:

(A) when, in Formula I $R^1$ is methyl and $R^2$ is hydrogen, the strain is selected from the subgroup consisting of f. sp. *microsclerotia* CBS and f. sp. *microsclerotia* IFO 6298; with the further provisos that:

(1) when the strain is specifically f. sp. *microsclerotia* CBS,
(a) $R^1$ and $R^2$ in Formula II have the same meaning as in Formula I as originally described when in Formula II $n$ is 1 and $m$ is 0; and
(b) $R^1$ in Formula II is always methyl when both $n$ and $m$ in Formula II are 0; and (2) when the strain is specifically f. sp. *microscelotia* IFO 6298, then in Formula II,
(a) $R^1$ and $R^2$ have the same meaning as in Formula I, $n$ is always 1, and $m$ is from 0 to 1;

(B) when in Formula I as originally described, $R^1$ is methyl and $R^2$ is hydroxy, the strain selected is f. sp. *microsclerotia* CBS, then, in Formula II,
(1) when $n$ is 1, $R^1$ is hydrogen, $R^2$ is hydroxy, and $m$ is 0, and
(2) when $n$ is 0, $R^1$ is of the group consisting of hydrogen and methyl, and $m$ is 0; and (C) when $R^1$ and $R^2$ are each hydrogen in Formula I, the strain selected is f. sp. *sasakii* IFO 6675, and then, in Formula II,
$R^1$ is hydrogen, $R^2$ is hydroxy, $n$ is 1 and $m$ is 0.

With respect to Formula I above, the compounds useful as precursors in the method of invention are the known compounds 7 - chloro - 1,3 - dihydro - 1 - methyl - 5-phenyl - 2H - 1,4 - benzodiazepin-2-one, i.e. diazepam, (III); 7 - chloro - 1,3 - dihydro - 3 - hydroxy - 1 - methyl - 5 - phenyl-2H-1,4-benzodiazepin-2-one, (IV); and 7 - chloro - 1,3 - dihydro-5-phenyl-2H-1,4-benzodiazepin-2-one (V).

The compounds falling within Formula II above obtained by the method of the invention when diazepam (III) is used as the precursor (I) and the strain selected for fermentation is f. sp. *microsclerotia* CBS, are specifically the known compounds 7-chloro-1,3-dihydro-3-hydroxy-1-methyl - 5 - phenyl-2H-1,4-benzodiazepin-2-one, (IV); 7 - chloro - 1,3 - dihydro-5-phenyl-2H-1,4-benzodiazepin-2-one, (V); and 7 - chloro - 1,3 - dihydro-3-hydroxy-5-phenyl-2H-benzodiazepin-2-one, (VI); and the novel compound 6-chloro-4-phenyl-1-methyl-2(1H)-quinazolinone, (VII); as represented by the reaction scheme given below:

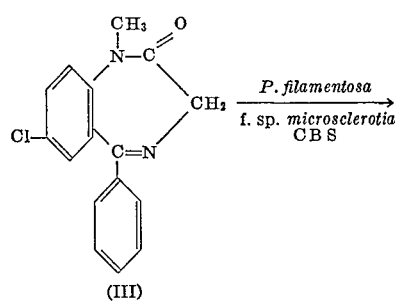

(III)

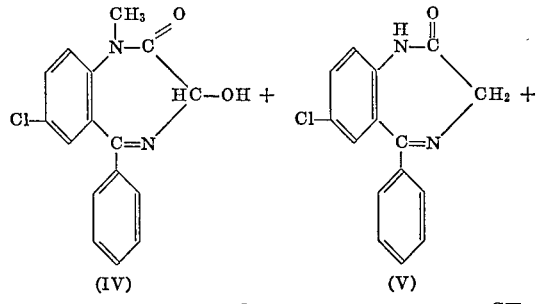

(IV)     (V)

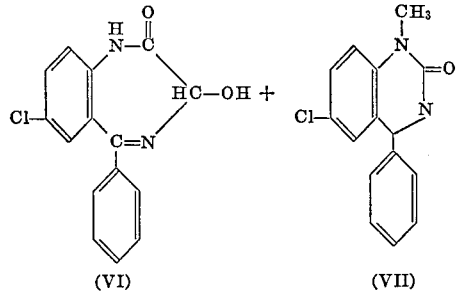

(VI)     (VII)

wherein:

(III) is 7-chloro-1,3-dihydro-1-methyl-5-phenyl-2H-1,4-benzodiazepin-2-one
(IV) is 7-chloro-1,3-dihydro-1-methyl-3-hydroxy-5-phenyl-2H-1,4-benzodiazepin-2-one
(V) is 7-chloro-1,3-dihydro-5-phenyl-2H-1,4-benzodiazepin-2-one
(VI) is 7-chloro-1,3-dihydro-3-hydroxy-5-phenyl-2H-1,4-benzodiazepin-2-one
(VII) is 6-chloro-4-phenyl-1-methyl-2(1H)-quinazolinone The compounds falling within Formula II obtained by the method of the invention when 7-chloro-1,3-dihydro-3-hydroxy-1-methyl-5-phenyl-2H-1,4-benzodiazepin-2-one (IV) is used as the precursor (I), and the strain selected for the fermentation is f. sp. *microsclerotia* CBS, are specifically the known compounds 7-chloro-1,3-dihydro-3-hydroxy-5-phenyl-2H-1,4-benzodiazepin-2-one (VI), 6-chloro-4-phenyl-2(1H)-quinazolinone (VIII) and the novel compound 6-chloro-4-phenyl-1-methyl-2(1H)-quinazolinone (VII); as represented by the reaction scheme given below:

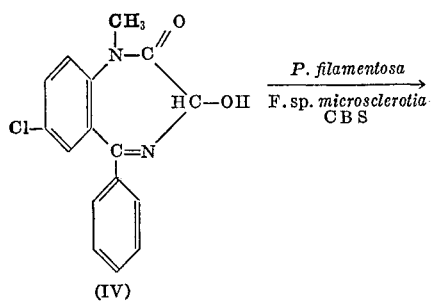

(IV)

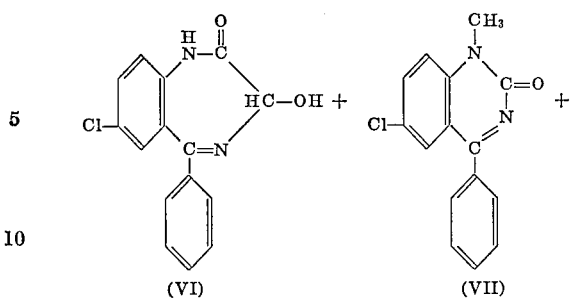

(VI)     (VII)

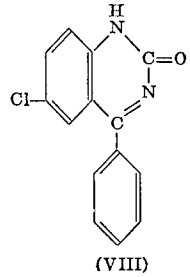

(VIII)

wherein:

(IV) is 7-chloro-1,3-dihydro-1-methyl-3-hydroxy-5-phenyl-2H-1,4-benzodiazepin-2-one
(VI) is 7-chloro-1,3-dihydro-3-hydroxy-5-phenyl-2H-1,4-benzodiazepin-2-one
(VII) is 6-chloro-4-phenyl-1-methyl-2(1H)-quinazolinone
(VIII) is 6-chloro-4-phenyl-2(1H)-quinazolinone The compounds falling within Formula II obtained by the method of the invention when diazepam (III) is used as precursor (I), and the strain selected for the fermentation is f. sp. *microsclerotia* IFO 6298, are specifically the known compounds 7-chloro-1,3-dihydro-3-hydroxy-1-methyl-5-phenyl-2H-1,4-benzodiazepin-2-one, (IV); 7-chloro-1,3-dihydro-5-phenyl-2H-1,4-benzodiazepin-2-one, (V); 7-chloro-1,3-dihydro-3-hydroxy-5-phenyl-2H-1,4-benzodiazepin-2-one, (VI); 7-chloro-1,3-dihydro-1-methyl-5-phenyl-2H-1,4-benzodiazepin-2-one-4-oxide, (IX); and 7-chloro-1,3-dihydro-5-phenyl-2H-1,4-benzodiazepin-2-one-4-oxide, (X); as represented by the reaction scheme given below:

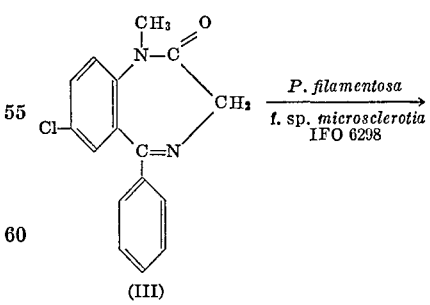

(III)

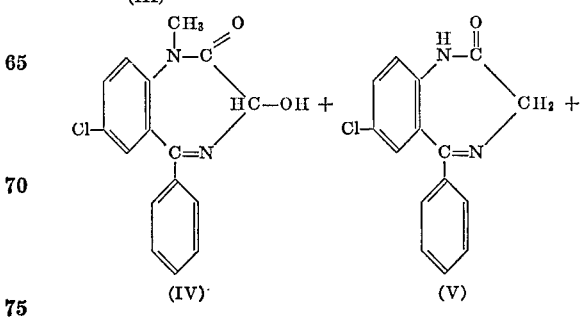

(IV)     (V)

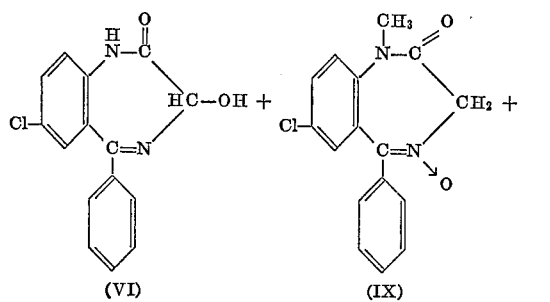

(VI)  (IX)

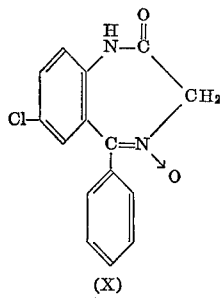

(X)

wherein:

(III) is 7-chloro-1,3-dihydro-1-methyl-5-phenyl-2H-1,4-benzodiazepin-2-one (IV) is 7-chloro-1,3-dihydro-1-methyl-3-hydroxy-5-phenyl-2H-1,4-benzodiazepin-2-one (V) is 7-chloro-1,3-dihydro-5-phenyl-2H-1,4-benzodiazepin-2-one (VI) is 7-chloro-1,3-dihydro-3-hydroxy-5-phenyl-2H-1,4-benzodiazepin-2-one (IX) is 7-chloro-1,3-dihydro-1-methyl-5-phenyl-2H-1,4-benzodiazepin-2-one-4-oxide (X) is 7-chloro-1,3-dihydro-5-phenyl-2H-1,4-benzodiazepin-2-one-4-oxide The compound falling within Formula II obtained by the method of the invention when 7-chloro-1,3-dihydro-5-phenyl-2H-1,4-benzodiazepin-2-one (V) is used as precursor (I) and the strain selected for the fermentation is f. sp. *sasakii* IFO 6675, is specifically the known compound 7-chloro-1,3-dihydro-3-hydroxy-5-phenyl-2H-1,4-benzodiazepin-2-one (VI), as represented by the reaction scheme given below:

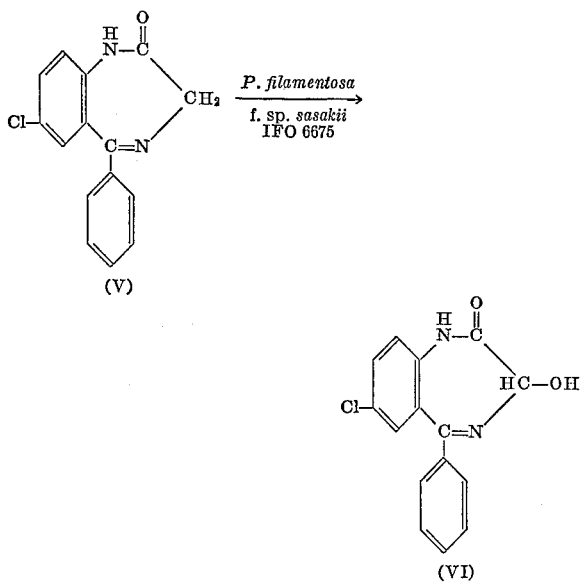

The "CBS" strain of *Pellicularia filamentosa* is obtainable from the Central Bureau voor Schimmelcultures, Baarn, Holland; the "IFO" strains are obtainable from the Institute for Fermentation, Osaka, Japan. The preparation of the incubated fermentation broth of the selected strain of *Pellicularia filamentosa*, into which the benzodiazepine derivative (I) to be modified is introduced, in accordance with the method of the invention described hereinbefore, may follow conventional procedures known in this art. For example, agar slants of the selected strain may be washed with distilled water, the resulting suspensions transferred to containers containing suitable nutrients in distilled water and the containers then agitated during incubation at 28° C. for about three days. Thereafter, mycelial transfers may be made into new changes of aqueous nutrient medium, followed by additional incubation under agitation for about an additional day. There may then be added to the containers the compound to be modified, with fermentation then continued up to about six days, at which time the modified products may be recovered from the fermentation broths.

In the use of the compounds obtained by the method of the invention, as tranquilizing agents, said compounds may be administered alone or in combination with pharmaceutically acceptable carriers, the proportion of which is determined by the solubility and chemical nature of the compound selected, the chosen routes of administration, and standard pharmaceutical practice, as in the case of other known benzodiazepine derivatives. For example, they may be administred orally in the form of tablets or capsules, which may contain conventional excipients, or in the form of solution; or they may be injected parenterally, that is intramuscularly, intravenously or subcutaneously. For parenteral administration, they may be used in the form of sterile solutions containing other solutes, for example, enough saline or glucose to make the solutions isotonic.

The dosage of the present therapeutic agents will vary with the form of administration and the particular compound chosen. It will generally be found that when the composition is administered orally, larger quantities of the active agent will be required to produce the same effect as a smaller quantity given parenterally. In general, the compounds of this invention are most desirably administered at a concentration level that will generally afford affective results without causing any harmful or deleterious side effects and preferably at a level that is in the range of from about 0.06 mg. to about 2.0 mg. per kg. of body weight per day, although as aforementioned, variations will occur. However, a dosage level that is in the range of from about 0.2 mg. to about 0.6 mg. per kg. of body weight per day is most desirably employed in order to achieve effective results.

The following examples are illustrative of the method of the invention for modifying the benzodiazepine derivatives (I), but are not to be considered necessarily limitative thereof:

Example I.—Diazepam as substrate (A) An agar slant of *Pellicularia filamentosa* f. sp. *microsclerotia* CBS was washed with 5 ml. of distilled water, and one-half of the resulting suspension was transferred to a 250 ml. Erlenmeyer flask containing 50 ml. of the following medium:

|  | g./l. |
|---|---|
| Corn steep liquor | 5 |
| Dextrose | 20 |
| Peptone | 20 |
| Distilled $H_2O$ | 1000 |

The flask was incubated on a rotary shaker, 250 r.pm., 2″ diameter of rotation, at 28° C. After 66 hours of agitation, a mycelial transfer, 10 percent, was made to a new flask of medium.

(B) Following 24 hours of incubation as above, 12.5 mg. of diazepam (III) in 0.5 ml. of ethanol was added to the flask which was returned to the shaker.

(C) Five ml. samples were taken after 1, 2, 3 and 6 days. The pH of the samples was adjusted to pH 10–11 with 2 N NaOH, and one ml. of methyl-isobutyl-ketone (MIBK) was added to each sample prior to equilibration. An aliquot of the extract was spotted on Whatman No. 4 paper, and the papergram was run in the toluene/propylene glycol system. The products were detected by means of UV absorption and a fluorescent screen.

(D) Two UV absorbing products with $R_f$ values corresponding to those of 7-chloro-1,3-dihydro-3-hydroxy-1-methyl-5-phenyl-2H-1,4-benzodiazepin-2-one (IV) and 7-chloro - 1,3-dihydro-5-phenyl-2H-1,4-benzodiazepin-2-one (V) were noted after 24 hours. At 48 hours, a third, more polar product was observed with the $R_f$ of 7-chloro-1,3-dihydro - 3 - hydroxy-5-phenyl-2H-1,4-benzodiazepin-2-one (VI). An increase in the size of this zone was found at three and six days. In addition, two fluorescent products were detected, the less polar of which appeared at two days and possessed an $R_f$ equal to that of 7-chloro-1,3 - dihydro-3-hydroxy-1-methyl-5-phenyl-2H-1,4-benzodiazepin-2-one (IV). This increased in size and intensity up to six days, by which time 6-chloro-4-phenyl-1-methyl-2(1H)-quinazolinone (VII) was produced.

Example II.—Diazepam as substrate (preparative scale ferementation)

(A) Four agar slants of *P. filamentosa* f. sp. *microsclerotia* CBS were each washed with 5 ml. of distilled water, and the resulting suspensions were transferred to four one liter flasks, each containing 200 ml. of the medium described in Example I(A). The flasks were incubated for 65 hours on a rotary shaker at 28° C., after which mycelial transfers, 10 percent, were made to thirteen two liter flasks with 400 ml. of medium.

(B) Aeration and agitation of the flasks for 27 hours were followed by supplementation of each flask with 100 mg. of diazepam (III) dissolved in 4 ml. of ethanol.

(C) Incubation of the flasks was resumed, and the course of the transformation of diazepam was followed daily for four days. Representative flasks were sampled, and the samples were processed as described in Example I(C). The fermentation broth was harvested at 100 hours.

(D) A two liter aliquot of the filtered broth was adjusted to pH 9.0 with 5 N sodium hydroxide and extracted four times with 500 ml. portions of ether. The extracts were dried over sodium sulfate, filtered and evaporated to dryness under vacuum. The residue was dissolved in 20 ml. of acetone. One ml. aliquots of this solution were streaked across glass plates coated with a 0.7 mm. thick layer consisting of silica gel containing 5 percent rice starch as a binder. The chromatograms were developed with a mixture of chloroform-acetone-ethanol in the proportions 8:1:1 by volume. Under UV light weakly fluorescent bands located in the same position as authentic samples of 7-chloro-1,3-dihydro-3-hydroxy - 1 - methyl-5-phenyl-2H-1,4-benzodiazepin-2-one (IV) and 7-chloro-1,3-dihydro-5-phenyl-2H-1,4-benzodiazepin-2-one (V) were observed. The adsorbent from these areas was scraped off the plates and treated with acetone containing 5 percent water by volume. After one hour the adsorbent was filtered off and the aqueous acetone was evaporated under vacuum.

(E) The residue derived from the zone with the mobility of 7 - chloro-1,3-dihydro-5-phenyl-2H-1,4-benzodiazepin-2-one (V) was kept under cold heptane until it crystallized. Identity of the crystalline material with 7-chloro - 1,3 - dihydro-5-phenyl-2H-1,4-benzodiazepin-2-one (V) was established by IR spectroscopy. The residue derived from the zone with the mobility of 7-chloro-1,3-dihydro - 3 - hydroxy-1-methyl-5-phenyl-2H-1,4-benzodiazepin-2-one (IV) was kept under cold cyclohexane. The crystalline material obtained was identical with 7-chloro - 1,3 - dihydro-3-hydroxy-1-methyl-5-phenyl-2H-1,4-benzodiazepin-2-one (IV), as shown by its IR spectrum.

In addition to 7-chloro-1,3-dihydro-5-phenyl-2H-1,4-benzodiazepin-2-one (V) and 7-chloro-1,3-dihydro-3-hydroxy - 1 - methyl-5-phenyl-2H-1,4-benzodiazepin-2-one (IV), spots with the mobilities of 7-chloro-1,3-dihydro-3-hydroxy-5-phenyl-2H-1,4-benzodiazepin-2-one (VI) and 6 - chloro-4-phenyl-1-methyl-2(1H)-quinazolinone (VII) were detected on thin layer chromatograms. The spot with the mobility of 6-chloro-4-phenyl-1-methyl-2(1H)-quinazolinone (VII) had the same brilliant bluish white fluorescence as 6-chloro-4-phenyl-1-methyl-2(1H)-quinazolinone (VII), obtained in Example I.

Example III.—7-chloro-1,3-dihydro-3-hydroxy-1-methyl-5-phenyl-2H-1,4-benzodiazepin-2-one as substrate The procedure described in Example I(A) for growing *P. filamentosa* f. sp. *microsclerotia* CBS was repeated for the transformation of 7-chloro-1,3-dihydro-3-hydroxy-1 - methyl - 5 - phenyl-2H-1,4-benzodiazepin-2-one (IV). Twelve and one-half mg. of the compound, dissolved in 0.5 ml. ethanol, was added to the fermentation flask, which was incubated as noted earlier. Five ml. samples were taken at 1, 2 and 6 days and processed according to the method of Example I(C).

Paper chromatography, in the toluene/propylene glycol system, disclosed a UV absorbing product, less mobile than the substrate, with the $R_f$ of 7-chloro-1,3-dihydro-3-hydroxy - 5 - phenyl-2H-1,4-benzodiazepin-2-one (VI); two fluorescent products were also formed, the less polar of which, 6 - chloro-4-phenyl-1-methyl-2(1H)-quinazolinone (VII), possessed an $R_f$ similar to that of 7-chloro-1,3 - dihydro-3-hydroxy-1-methyl-5-phenyl-2H-1,4-benzodiazepin-2-one (IV). Paper chromatography in the $CHCl_3$/formamide system confirmed the identiy of the UV absorbing product as 7-chloro-1,3-dihydro-3-hydroxy-5-phenyl-2H-1,4-benzodiazepin-2-one (VI).

Example IV.—7-chloro-1,3-dihydro-1-methyl-3-hydroxy-5-phenyl-2H-1,4-benzodiazepin-2-one as substrate (preparative scale fermentation)

The procedure for the propagation of *P. filamentosa* f. sp. *microsclerotia* CBS in two liter flasks was similar to that followed in Example II(A) except that 25 two liter flasks were prepared. These flasks were each supplemented with 120 mg. of 7-chloro-1,3-dihydro-1-methyl-3-hydroxy-5-phenyl-2H-1,4-benzodiazepin-2-one (IV) dissolved in 4 ml. of ethanol; incubation was carried out on a rotary shaker at 28° C.

The course of the transformation was followed by the usual means, and the flasks were harvested at 120 hours.

Five liters of the filtered beer were adjusted to pH 8.2 with 5 N sodium hydroxide solution and extracted with five one liter portions of ether. The ether extracts were dried over sodium sulfate, filtered and evaporated to dryness under vacuum. The oily residue was dissolved in acetone and kept in the refrigerator. Crystalline material separated, which was washed with acetone-ether (1:1) and recrystallized from hot acetone. It was shown to be identical with 6-chloro-4-phenyl-1-methyl-2(1H)-quinazolinone (VII) by mixed melting point, element analyses and infrared spectroscopy.

The mother liquors and washings were chromatographed on silica gel coated glass plates as described in Example II(D), except that a mixture of 95 parts of toluene and 5 parts of ethanol was used for development. Crystalline 7-chloro-1,3-dihydro-3-hydroxy-5-phenyl-2H-1,4-benzodiazepin-2-one (VI), unchanged 7-chloro-1,3-dihydro-1-methyl - 3 - hydroxy-5-phenyl-2H-1,4-benzodiazepin-2-one (IV) and more 6-chloro-4-phenyl-1-methyl-2(1H)-quinazolinone (VII) were isolated from bands having the mobility of these compounds and identified by IR spectroscopy.

In addition to these, a fluorescent band with the mobility of 6-chloro-4-phenyl-2(1H)-quinazolinone (VIII) was observed, but insufficient material for crystallization was present.

Example V.—Diazepam as substrate

The fermentation procedure followed was identical to that described under Example I(A) and (B), except that the fungus utilized was *P. filamentosa* f. sp. *microsclerotia* IFO 6298 and that diazepam (III) was added at 0.2 g./l. (10 mg./flask).

The fermentation samples were processed as described in Example I(C). Papergrams of extracts of the one and two day samples, run in the toluene/propylene glycol system, disclosed the presence of four UV absorbing zones, the most polar of which was shown later to consist of two components. After two days of incubation, no diazepam (III) remained unaltered. The five products were shown to possess those of $R_f$ values corresponding to 7-chloro - 1,3 - dihydro-1-methyl-3-hydroxy-5-phenyl-2H-1,4 - benzodiazepin-2-one (IV), 7-chloro-1,3-dihydro-1-methyl - 5 - phenyl - 2H-1,4-benzodiazepin-2-one-4-oxide (IX), 7 - chloro - 1,3 - dihydro - 5 - phenyl - 2H - 1,4 - benzodiazepin - 2 - one (V), 7-chloro-1,3-dihydro-3-hydroxy-5-phenyl-2H-1,4-benzodiazepin-2-one (VI), and 7-chloro - 1,3 - dihydro - 5 - phenyl-2H-1,4-benzodiazepin-2-one-4-oxide (X), in order of decreasing mobility. Separation of the last two products was demonstrated in the benzene/formamide system on an extended chromatogram. A spray reagent was used to reveal the N-oxides (after transformation to oxaziridines by irradiation), which reagent was made up of equal parts of a saturated solution of O-tolidine in 2 percent acetic acid and of 0.05 M. solution of KI.

Example VI.—7-chloro-1,3-dihydro-5-phenyl-2H-1,4-benzodiazepin-2-one as substrate Five agar slants of *Pellicularia filamentosa* f. sp. *sasakii* IFO 6675 were each washed with 5 ml. of distilled water, and the resulting suspensions were transferred to five one liter flasks each with 200 ml. of the corn steep liquor-dextrose-peptone medium noted in Example I(A). After 67 hours of incubation at 28° C. on a rotary shaker, mycelial transfers, 40 ml., were made to each of 19 two liter flasks containing 400 ml. of the same medium.

Following aeration and agitation of the two liter flasks as above for 23 hours, eighty mg. of 7-chloro-1,3-dihydro-5-phenyl-2H-1,4-benzodiazepin-2-one (V) dissolved in 8 ml. of ethanol (95 percent) was added to each flask. Incubation of the flasks was resumed, and representative flasks were sampled at 3, 4, 6 and 7 days. The samples were processed as described in Example I(C) and aliquots of the MIBK extract were spotted on Whatman No. 4 filter paper. The papergrams were run in the benezene/formamide system, and the product, with the $R_f$ of 7-chloro - 1,3-dihydro - 3 - hydroxy-5-phenyl-2H-1,4-benzodiazepin-2-one (VI), was detected by means of UV absorption.

The fermentation was harvested at 174 hours. Chromatographic analysis disclosed that some substrate remained unconverted to the hydroxylated product.

The mycelium was separated from the broth by filtration under vacuum. Three liters of the clear filtrate was adjusted to pH 7.9 and extracted four times with 750 ml. ether each time. The ether extracts were pooled, dried over sodium sulfate and concentrated under vacuum. Solid material separated, which was crystallized from acetone. The identity of the crystalline material with 7-chloro - 1,3 - dihydro - 3-hydroxy-5-phenyl-2H-1,4-benzodiazepin-2-one (VI) was established by IR spectroscopy and thin layer chromatography.

An additional amount of product was obtained from the mycelium. The mycelium was washed with warm water and 80 percent aqueous methanol. The methanol was evaporated under vacuum and the aqueous phase was adjusted to pH 7.5 and extracted with ether. The ether extracts were processed as described above. The recovered material was crystallized from acetone. It gave an IR spectrum identical with that of 7-chloro-1,3-dihydro-3-hydroxy-5-phenyl-2H-1,4-benzodiazepin-2-one (VI).

We claim:

1. A method of causing the microbiological transformation of a compound selected from the group consisting of those having the following formula:

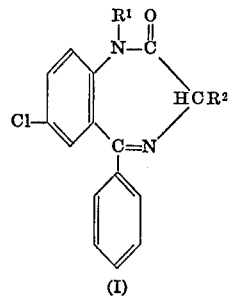

(I)

wherein $R^1$ is of the group consisting of hydrogen and methyl and $R^2$ is of the group consisting of hydrogen and hydroxy, which method comprises:

fermenting a compound of formula (I) above in the presence of a strain of the fungus *Pellicularia filamentosa* selected from the group consisting of f. sp. *microsclerotia* CBS, f. sp. *microsclerotia* IFO 6298, and f. sp. *sasakii* IFO 6675, to obtain a compound of the group having the following general formula:

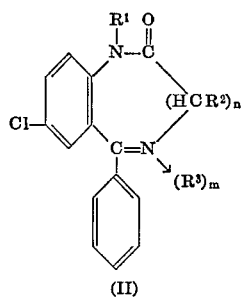

(II)

wherein $R^1$ and $R^2$ have the same meaning as in Formula I; $R^3$ is oxygen; and $n$ and $m$ are both integers from 0 to 1, only when limited by the following provisos:

(A) when, in Formula I, $R^1$ is methyl and $R^2$ is hydrogen, the strain is selected from the subgroup consisting of f. sp. *microsclerotia* CBS and f. sp. *microsclerotia* IFO 6298; with the further provisos that:

(1) when the strain is specifically f. sp. *microsclerotia* CBS, then in Formula II
  (a) when $n$ is 1, $m$ is 0, and $R^2$ is hydroxy, $R^1$ is selected from group consisting of hydrogen and methyl;
  (b) when $n$ is 1, $m$ is 0 and $R^2$ is hydrogen, $R^1$ is hydrogen; and
  (c) when $n$ and $m$ are both 0, $R^1$ is methyl; and (2) when the strain is specifically f. sp. *microsclerotia* IFO 6298, then in Formula II
  (a) when $n$ is 1, $m$ is 0 and $R^2$ is hydroxy, $R^1$ is selected from group consisting of hydrogen and methyl;
  (b) when $n$ is 1, $m$ is 0 and $R^2$ is hydrogen, $R^1$ is hydrogen; and
  (c) when $n$ and $m$ are both 1 and $R^2$ is hydrogen, $R^1$ is selected from the group consisting of methyl and hydrogen;

(B) when, in Formula I, $R^1$ is methyl and $R^2$ is hydroxy, the strain selected is f. sp. *microsclerotia* CBS, then, in Formula II:
  (1) when $n$ is 1, $R^1$ is hydrogen, $R^2$ is hydroxy and $m$ is 0, and
  (2) when $n$ is 0, $R^1$ is of the group consisting of hydrogen and methyl, and $m$ is 0; and (C) when $R^1$ and $R^2$ are each hydrogen in Formula I, the strain selected is f. sp. *sasakii* IFO 6675, and then, in Formula II:
  $R^1$ is hydrogen, $R^2$ is hydroxy, $n$ is 1 and $m$ is 0.

2. A method is defined in claim 1 wherein the compound of Formula I is 7-chloro-1,3-dihydro-1-methyl-5-phenyl-2H-1,4-benzodiazepin-2-one; the strain of the fungus *Pellicularia filamentosa* is f. sp. *microsclerotia* CBS and the compounds obtained are 7-chloro-1,3-dihydro-1-methyl-3-hydroxy-5-phenyl-2H-1,4-benzodiazepin-2-one; 7-chloro-1,3-dihydro-5-phenyl-2H-1,4-benzodiazepin-2-one; 7-chloro-1,3-dihydro-3-hydroxy-5-phenyl-2H-1,4-benzodiazepin-2-one; and 6-chloro-4-phenyl-1-methyl-2(1H)-quinazolinone.

3. A method as defined in claim 1 wherein the compound of Formula I is 7-chloro-1,3-dihydro-1-methyl-3-hydroxy-5-phenyl-2H-1,4-benzodiazepin-2-one; the strain of the fungus *Pellicularia filamentosa* is f. sp. *microsclerotia* CBS and the compounds obtained are 7-chloro-1,3-dihydro-3-hydroxy-5-phenyl-2H-1,4-benzodiazepin-2-one; 6-chloro-4-phenyl-1-methyl-2(1H)-quinazolinone; and 6-chloro-4-phenyl-2(1H)-quinazolinone.

4. A method as defined in claim 1 wherein the compound of Formula I is 7-chloro-1,3-dihydro-1-methyl-5-phenyl-2H-1,4-benzodiazepin-2-one; the strain of the fungus *Pellicularia filamentosa* is f. sp. *microsclerotia* IFO 6298 and the compounds obtained are 7-chloro-1,3-dihydro-1-methyl-3-hydroxy-5-phenyl-2H-1,4-benzodiazepin-2-one; 7-chloro-1,3-dihydro-5-phenyl-2H-1,4-benzodiazepin-2-one; 7-chloro-1,3-dihydro-3-hydroxy-5-phenyl-2H-1,4-benzodiazepin-2-one; 7-chloro-1,3-dihydro-1-methyl-5-phenyl-2H-1,4-benzodiazepin-2-one-4-oxide; and 7-chloro-1,3-dihydro-5-phenyl-2H-1,4-benzodiazepin-2-one-4-oxide.

5. A method as defined in claim 1, wherein the compound of Formula I is 7-chloro-1,3-dihydro-5-phenyl-2H-1,4-benzodiazepin-2-one; the strain of the fungus *Pellicularis filamentosa* is f. sp *sasakii* IFO 6675; and the compound obtained is 7-chloro-1,3-dihydro-3-hydroxy-5-phenyl-2H-1,4-benzodiazepin-2-one.

References Cited

UNITED STATES PATENTS 3,379,620  4/1968  Archer _____ 195—51

ALVIN E. TANENHOLTZ, *Primary Examiner.*

U. S. Cl. X.R.

260—239, 251; 424—244, 250